(12) United States Patent
Nishidai et al.

(10) Patent No.: US 6,335,851 B1
(45) Date of Patent: Jan. 1, 2002

(54) CURRENT-LIMITING DEVICE

(75) Inventors: Jun Nishidai; Yoshio Matsubara; Noriaki Tokuda; Masakuni Asano, all of Kyoto (JP)

(73) Assignee: Nissin Electric Co., LTD, Kyoto (JP)

( * ) Notice: Subject to any disclaimer, the term of this patent is extended or adjusted under 35 U.S.C. 154(b) by 0 days.

(21) Appl. No.: 09/354,269

(22) Filed: Jul. 15, 1999

(30) Foreign Application Priority Data

Jul. 16, 1998 (JP) ............................................ 10-202213
May 7, 1999 (JP) ............................................ 11-127600
May 7, 1999 (JP) ............................................ 11-127601

(51) Int. Cl.$^7$ ................................................ H02H 9/00
(52) U.S. Cl. ........................................ 361/58; 361/93.9
(58) Field of Search .......................... 361/58, 19, 93.1, 361/93.9, 103, 106

(56) References Cited

U.S. PATENT DOCUMENTS

| | | | | |
|---|---|---|---|---|
| 4,117,524 A | * | 9/1978 | Parton et al. | .................. 361/19 |
| 5,278,380 A | * | 1/1994 | Lowry | .......................... 361/19 |
| 5,892,644 A | * | 4/1999 | Evans et al. | .................... 361/19 |

* cited by examiner

*Primary Examiner*—Ronald W. Leja
(74) *Attorney, Agent, or Firm*—Finnegan, Henderson, Farabow, Garrett & Dunner, L.L.P.

(57) ABSTRACT

In a current-limiting device, a plurality of current-limiting elements are connected in series to one another, and are inserted between the system power source of an electric power system and the load thereof. In the device, transformers, the number of which is equal to that of the current-limiting element S1 through Sn, are arranged. The primary windings of the transformers are connected to the current-limiting elements in the same polarity, respectively, and all the secondary wings thereof are connected in parallel to one another.

9 Claims, 5 Drawing Sheets

PRIOR ART

*FIG. 8*

PRIOR ART

CURRENT-LIMITING DEVICE

BACKGROUND OF THE INVENTION

1. Field of the Invention

The present invention relates to a current limiting device. More specifically, the present invention relates to a current limiting device which is applied to a general AC circuit including all electric power systems (low voltage power systems to ultra-high voltage power systems), and is used to suppress over-current attributing to short-circuit accidents or in-rush current which may flow upon application of load.

2. Description of the Related Art

For instance, all power systems (low voltage power systems to ultra-high voltage power systems) have a current limiting device to suppress over-current attributing to short-circuit accidents or in-rush current which may flow upon application of load so as to reduce the interrupting capacity required for the circuit breaker. For example, as a current limiting device, there are a super-conductive current-limiting element utilizing the quench phenomenon of a super-conductor, or a thermal current-limiting element of a positive temperature characteristic (PTC) thermistor.

The super-conductive current-limiting element utilizing the quench phenomenon of a super conductor, such as a film type super-conductive current limiting element, is to increase the resistance instantaneously when over-current higher than the critical current occurs. That is, it is popularly employed as a high performance element because it is high in response, and of a self-operation type; that is, it is high in reliability. On the other hand, the thermal current-limiting device of the positive temperature characteristic (PTC) thermistor is formed with polymer material or barium titanate material. It generates heat when over-current is allowed to flow therein, so that it increases the resistance. Hence, it is also popularly employed being economical, and simple in construction.

Figure 7:
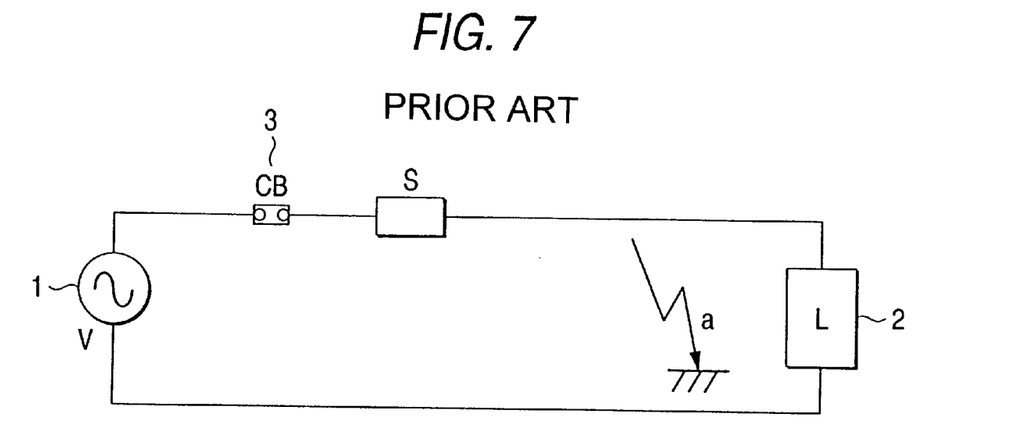
FIG. 7 is a diagram showing a conventional current limiting device.

The current-limiting device utilizing the super-conductive current-limiting element or the thermal current-limiting element is such that, as shown in FIG. 7, a current-limiting element S is series-connected between the system power source 1 of the power system and the load 2. For instance, in the case where a short-circuit accident a occurs to allow the flow of over-current, the resistance is increased because of the quench phenomenon. In the case of the thermal current-limiting element, heat is generated to increase the resistance. That is, the increase in resistance of the current-limiting element S suppress the over-current flowing in the electric power system. While the current-limiting element S performs its current-limiting function, a circuit breaker 3 is opened thereby to open the circuit of the electric power system.

Figure 8:
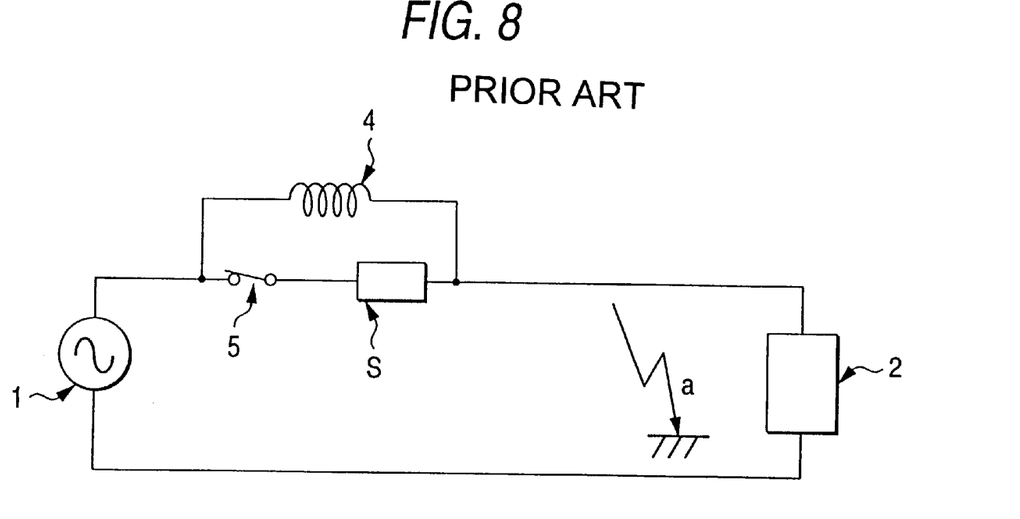
FIG. 8 is a circuit diagram showing another conventional one in which current limiting element are applied to a system whose linkage can not be opened.

In the above-described current limiting device, the current limiting element S is applied to the system whose linkage can be opened. However, the current limiting element can be applied to the system whose linkage cannot be opened. In the latter case, as shown in FIG. 8, a current limiting reactor 4 is connected in parallel to the current limiting element S. Normally, a current is allowed to flow in the current limiting element S. When a short-circuiting current flows in the element S; that is, when the element S is increased in resistance, the current is transferred to the current limiting reactor 4, and the switch S is operated to electrically disconnect the current limiting element S from the system, so that the system is ready for restoration.

Figure 9:
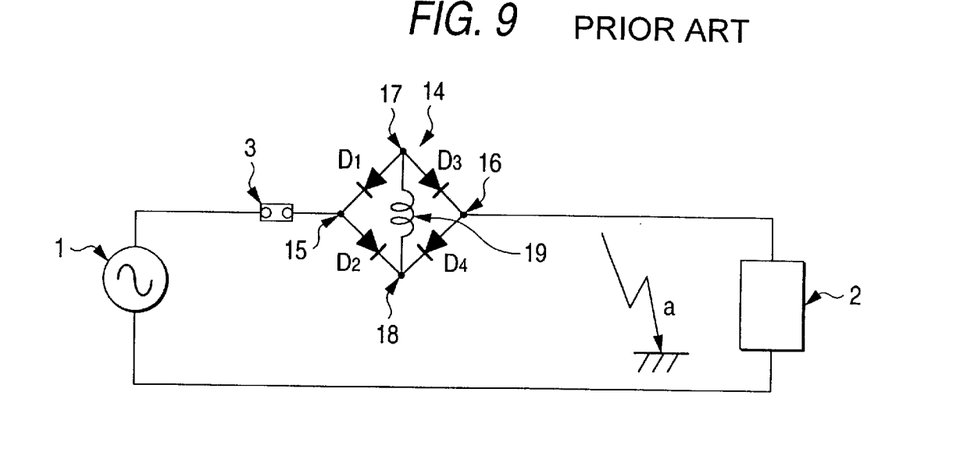
FIG. 9 is a circuit diagram showing a conventional current limiting device using a rectifying bridge circuit.

A current limiting device utilizing the rectifying bridge circuit is as shown in FIG. 9. The AC terminals 15, 16 of the rectifying bridge circuit 14, which is formed with four diodes $D_1$ through $D_4$, are connected in series to the electric power system, and a DC reactor 19 is connected between the DC terminals 17 and 18. In the case where a high-speed response type current limiting effect is required, the current limiting device is suitable. Thus, it is popularly employed.

The current limiting device functions as follows when a short-circuiting accident occurs. That is, the AC current exceeds the DC current flowing in the DC reactor 19 due to the occurrence of the short-circuiting accident a, the pair of diodes $D_1$ and $D_4$, or $D_2$ and $D_3$ are stopped. If this is viewed from the AC terminals 15 and 16, during this period, the DC reactor 19 is inserted in series in the AC circuit, and the generation of a voltage across the DC reactor 19 suppresses the over-current flowing in the electric power system. While the rectifying bridge circuit 14 limits the current, the circuit breaker 3 is opened thereby to open the linkage of the electric power system.

By the way, the current-limiting device having the conventional super-conductive current-limiting element or thermal current-limiting element has the following problems.

First, the super-conductive current-limiting element is poor in thermal conduction in the direction of length, and it is considerably difficult to arrange the quench phenomenon occurrence characteristic in the direction of length. The thermal current-limiting element is considerably difficult to make the resistance-temperature characteristic completely uniform in the direction of length.

That is, in the case of those current limiting elements, only the element limited in length can be used in which heat generated partially is quickly thermal-diffused so that the whole is uniformly increased in temperature. Therefore, its rated voltage is of the order of 100V per an element. Hence, when it is applied, for instance, to electric power systems of 200V, 400V, 6600V or the like, at the time of current limitation, voltages corresponding to system voltages should be assigned to current-limiting elements. As a result, a plurality of current-limiting elements are connected in series.

However, if a plurality of current-limiting elements are series-connected, a common short-circuiting current flows in each of the elements. Therefore, if the elements are not uniform in characteristic, a part of the plurality of current-limiting elements is firstly increased in resistance. Consequently, heat-generating power concentrates at the element to thermally break the elements, or over-current concentrates as the elements to break the insulation thereof. This is a fatal problem.

Furthermore, the conventional current limiting device having the thermal current limiting element S, and the conventional current limiting device having the rectifying bridge circuit 14 have the following problems.

In the case that the thermal current limiting element S is the thermal current limiting element of a positive temperature characteristic (PTC) thermistor, the thermal current limiting element itself is simple in construction and economical. It functions in such a manner that, for instance at the time of a short-circuiting accident, the over-current generates heat, thus limiting the flow of current. However, the current limiting action has a delay of several tens of milli-seconds (msec), so that it is impossible to suppress the sudden current.

On the other hand, in the case of the rectifying bridge circuit 14, at the time of a short-circuit accident, the inductance of the DC reactor 19 positively limits the over-current. However, the DC current flowing in the DC reactor 19 increases every half cycle. Therefore, in order to expect the current limiting effect for a certain period of time, for instance 50 to 100 msec, both the cost and the loss are increased. Hence, in order to maintain the current limiting function for a relatively long period of time, for instance for more than 50 msec from the occurrence of a short-circuiting accident, it is necessary to provide a larger DC reactor. That is, the current limiting device using the rectifying bridge circuit is not economical.

In order to eliminate the above-described difficulties accompanying those devices, the following current limiting device has been proposed. That is, the thermal current limiting element S and the rectifying bridge circuit 14 are combined to mutually complement their characteristics. In other words, the device thus proposed is such that, at the time of occurrence of a short-circuiting accident a, the sudden current can be suppressed with simple means, and the current limiting function is maintained for a relatively long period of time.

The current limiting device described above is as shown in FIG. 10. The AC terminals 15 and 16 of a rectifying bridge circuit 14 are connected in series to the electric power system, and a DC reactor 19 is connected between the DC terminals 17 and 18 of the rectifying bridge circuit 14. On the AC side of the rectifying bridge circuit 14, a thermal current limiting element S is connected in series which generates heat in response to the flow of over-current thereby to increase its resistance.

Figure 10:
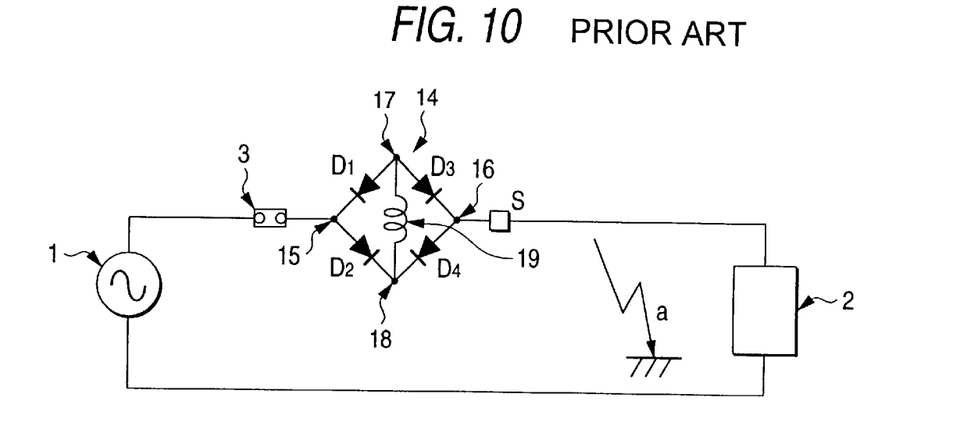
FIG. 10 is a circuit diagram showing a current limiting device which is a premise of the invention in which a rectifying bridge circuit and a thermal current limiting element are combined together.

In the current limiting device, the thermal current limiting element S and the rectifying bridge circuit 14 function to complement their characteristics. Accordingly, at the time of occurrence of a short-circuiting accident, the rectifying bridge circuit 14 positively suppresses the sudden current, thus providing a current limiting effect in high-speed response. Moreover, the thermal current limiting element S maintains the current limiting function for a relatively long period of time, thus providing a current limiting effect in low-speed response.

Figure 11:
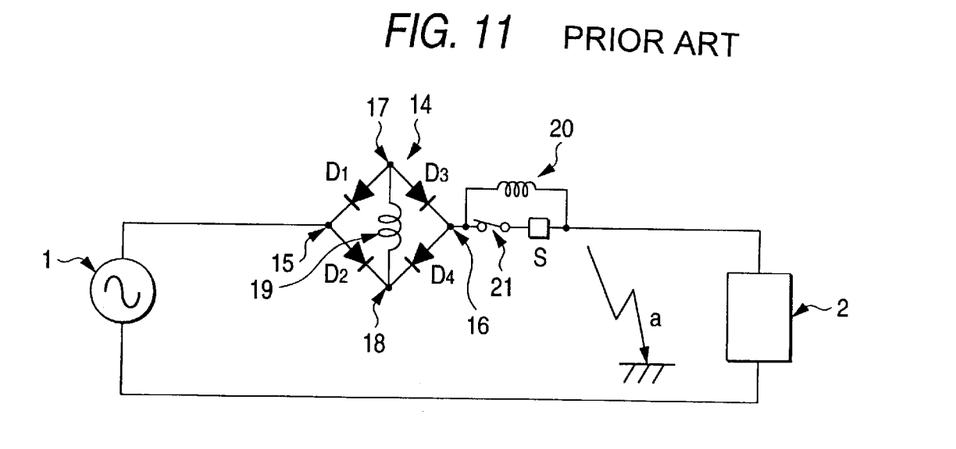
FIG. 11 is a circuit diagram showing a current limiting device which is a premise of the invention in which the thermal current limiting element is applied to a system whose linkage cannot be opened.

In the case of the current limiting device, the thermal current limiting element S is applied to the system whose linkage can be opened. However, the element S may be applied to the system whose linkage cannot be opened. In this case, as shown in FIG. 11, a current limiting reactor 20 is connected in parallel to a thermal current limiting elements. Normally, current is allowed to flow in the thermal current limiting elements. If a short-circuiting current flows to increase the resistance of the thermal current limiting element S, the current is transferred over to the current limiting reactor 10, and a switch 11 is operated to electrically disconnect the thermal current limiting element S from the system so that the latter S is restored.

The thermal current limiting element S combined with the rectifying bridge circuit 14 is limited in length. That is, the length must be such that heat generated at a part of the element is quickly diffused to increase the temperature of the element uniformly. Therefore, the rated voltage thereof is of the order of 100V per element. Hence, in the case where it is required to apply the thermal current limiting element to an electric power system of 200V, 400V, 600V, or the like, a plurality of thermal current limiting elements are connected in series, because they must share the voltage corresponding to the system voltage for the current limitation.

However, in the case where a plurality of thermal current limiting elements are connected in series, the short-circuiting current flows in each of the thermal current limiting elements. Therefore, if the thermal current limiting elements are not uniform in characteristic, some of the thermal current limiting elements become high in resistance. As a result, heat generating power is concentrated on those thermal current limiting elements, thus thermally breaking it, or the over-current is concentrated on them, thus breaking their insulation. This is a fatal problem in this case.

SUMMARY OF THE INVENTION

It is an object of the present invention to provide a current-winding device, in the case where a plurality of super-conductive current-limiting elements or thermal current-limiting elements are series-connected, even if those elements are not uniform in characteristic, which can prevent the breakage of those element by concentrating heat-generating power or over current concentrates at one of those elements.

The present invention provides a current-limiting device having a plurality of current-limiting elements connected in series and inserted in an AC circuit. The current-limiting element is a super-conductive current-limiting element which is increased in resistance by a super conductor quench phenomenon. Alternatively, the current-limiting element is a thermal current-limiting element, which generates heat by over-current and is increased in resistance by temperature rise. The current-limiting device have one of the following features.

(1) The current-limiting device has transformers in which the number of the transformers is equal to that of the current-limiting elements, primary windings of the transformers being connected in the same polarity, respectively, and secondary windings thereof connected in parallel to one another.

(2) The current-limiting device has windings in which the number of the windings is equal to that of the current-limiting element, and a common iron core to which the windings are magnetically coupled, wherein the windings are connected for the current-limiting elements in the same polarity, respectively.

(3) The current-limiting device has a plurality of blocks, each block comprising a plurality of primary windings, a secondary winding and a common iron core to which the primary windings and the secondary winding are magnetically coupled, wherein the primary windings of a plurality of the blocks are connected for the thermal current-limiting elements in the same polarity, and all the secondary windings of the blocks are connected in parallel to one another.

In the case of the super-conductive current-limiting element, in the steady state the current flows to the super-conductive current-limiting elements. However, when a short-circuiting accident occurs due to the fluctuation in characteristic, one or some of the plurality of super-conductive current-limiting elements are increased in resistance by the quench phenomenon. Accordingly, the short-circuiting current flows to the transformers which are in parallel with the elements thus quenched. Therefore, the current flowing to the elements is quickly decreased to prevent the generation of over-heat.

On the other hand, since the secondary windings which are provided for the elements in the same polarity, respectively, are parallel-connected to one another, the current flowing to the transformers quickly increases the currents of the elements which are not quenched yet, and forcibly quenches the elements. With the element which has been quenched, the abrupt decrease of element current occurs. The element which has not been quenched yet is quickly quenched because of the commutation of short-circuiting current. Hence, all the elements are quenched substantially at the same time; that is, the elements are uniformed in quench.

As was described above, the secondary windings provided respectively for the elements are connected in parallel to one another. Therefore, the terminal voltages (voltages across the primary windings of the transformers) of the elements are uniformed, and the difficulty is eliminated that over-current concentrates at part of the elements.

In the case of the thermal current-limiting element, when over-current flows, for instance, due to a short-circuiting accident, part of a plurality of the elements is increased in resistance because of the fluctuation in characteristic. When this phenomenon occurs, since the secondary windings provided respectively for the elements are connected in parallel to one another, current flows to the elements through the transformers so that the terminal voltages (voltages across the primary windings of the transformers) of the elements. Since the primary windings are provided in the same polarity, the direction of currents flowing through the transformers is such that, in the element which is increased in resistance, the current decreases, while in the element which is not increased in resistance, the current increases. Accordingly, the currents flowing through the transformers flow so that the elements are uniform in resistance.

A transformer on which windings are wound on one and the same iron core is equivalent to a multi-winding transformer. Therefore, similarly as in the above-described case, current flows through the windings so that the terminal voltages of the windings be uniform. And, since the primary windings are provided in the same polarity, the current flows so that the elements are uniform in resistance.

Further, the current-limiting device has another feature (4). That is, (4) the current-limiting device has windings in which the number of the windings is equal to that of the current-limiting element, wherein the windings is magnetically coupled to the current-limiting element, the windings is connected to the current limiting elements in the same polarity, respectively, and the combined inductance of the windings which are connected in series to one another is equal to or larger than a minimum value which is determined from an aimed current limiting value.

In the steady state, current flows in the super-conducting current limiting elements or the thermal current limiting elements. If an over-current flows by the occurrence of a short-circuiting accident, then since the elements are not uniform in characteristic, some of the elements are increased in resistance. As a result, the short-circuit current is transferred over to the windings connected to the defective elements.

In this case, the windings of the current limiting elements are connected to the current limiting elements, respectively, in such a manner that they are the same in polarity and are magnetically coupled to one another. Hence, because of the mutual induction of the windings, in the current limiting elements which are increased in resistance the element current flows in such a manner as to decrease, and in the thermal current limiting elements which are not increased in resistance the element current flows in such a manner as to increase. Therefore, with respect to the thermal current limiting elements which are increased in resistance, heat is prevented from being generated excessively, and with respect to the thermal current limiting elements which are not increased in resistance, the difficulty is prevented that the resistance is increased by the increase of the element current. Hence, even if the current limiting elements are not uniform in characteristic, they are uniformly increased in resistance.

In the case where the current limiting elements are applied to the system whose linkage cannot be opened, the device functions as follows: That is, when all the current limiting elements are increased in resistance, and the short-circuiting current is transferred to the windings, then those windings function as a current limiting reactor while being connected in series to each other.

Moreover, the present invention provides a current limiting device in which the AC terminals of a rectifying bridge circuit are connected in series to an electric power system, a DC reactor is connected between the DC terminals of the rectifying bridge circuit, and a plurality of thermal current limiting elements, which generate heat by over-current to increase the resistances thereof, are connected in series to the AC side of the rectifying bridge circuit. The current-limiting device has windings in which the number of the windings is equal to that of the current-limiting element, wherein the windings is magnetically coupled to the current-limiting element, the windings is connected to the current limiting elements in the same polarity, respectively, and the combined inductance of the windings which are connected in series to one another is equal to or larger than a minimum value which is determined from an aimed current limiting value.

According to the current limiting device, in the steady state, the current flows in the thermal current limiting elements. However, if a short-circuiting accident occurs, the over-current flows therein. If the thermal current limiting elements are not uniform in characteristic and some of the elements are increased in resistance, the short-circuiting current is transferred to the windings which are connected in parallel to the defective elements due to the resistance of the elements which have been thus increased.

In this case, the windings of the thermal current limiting elements are connected to the thermal current limiting elements in the same polarity, respectively, in such a manner that they are magnetically coupled to one another. Hence, because of the mutual induction of the windings, in the thermal current limiting elements which are increased in resistance the element current flows in such a manner as to decrease, and in the thermal current limiting elements which are not increased in resistance the element current flows in such a manner as to increase. Therefore, with respect to the thermal current limiting elements which are increased in resistance, heat is prevented from being generated excessively, and with respect to the thermal current limiting elements which are not increased in resistance, the difficulty is prevented that the resistance is increased by the increase of the element current. Hence, even if the thermal current limiting elements are not uniform in characteristic, they are uniformly increased in resistance.

In the case where the thermal current limiting elements are applied to the system whose linkage cannot be opened, the device functions as follows: That is, when all the thermal current limiting elements are increased in resistance, and the short-circuiting current is transferred to the windings, then those windings function as a current limiting reactor in such a manner that they are connected in series to each other.

PREFERRED EMBODIMENTS OF THE INVENTION

Preferred embodiments of a current-limiting device utilizing a super-conductive current-limiting element or thermal current-limiting element will be described in detail. In the following description, parts which are in common with the super-conductive current-limiting element and the thermal current-limiting element will be referred to merely as "a current-limiting element" when applicable, and the contents peculiar to the super-conductive current-limiting element and those peculiar to the thermal current-limiting element are referred to as "a super-conductive current-limiting element" and "a thermal current-limiting element", respectively, when applicable.

Figure 1:
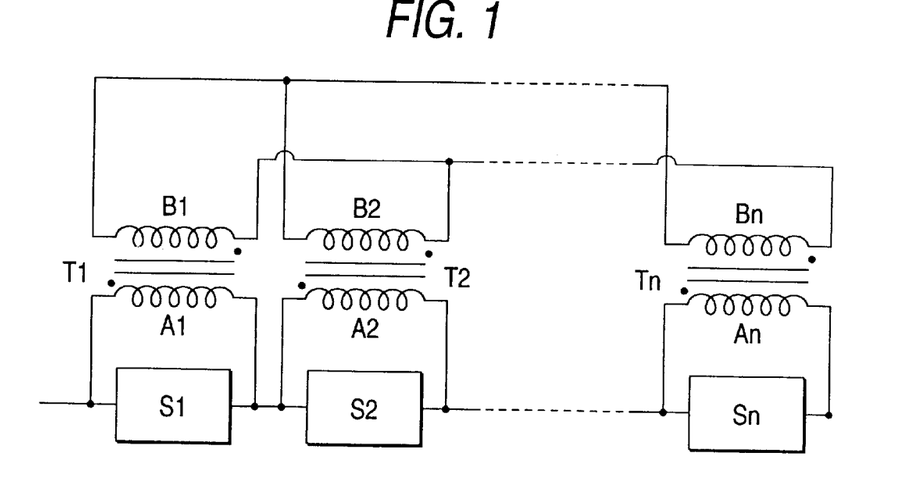
FIG. 1 is a circuit diagram showing a first embodiment of a current-limiting device according to the present invention.

FIG. 1 shows an embodiment of the current-limiting device, which constitutes a first embodiment of the invention. In the device, a plurality of (1 through n) current-limiting elements S1 through Sn are series-connected between the system power source 1 of an electric power system and a load 2 (cf. FIG. 7). Each of the current-limiting elements S1 through Sn is a film-type super-conductive current-limiting element whose resistance is increased by the quench phenomenon of a super conductor, or a thermal current-limiting element of a positive temperature characteristic (PTC) thermistor which generates heat by the flow of over-current thereby to increase its resistance. In the embodiment, transformers T1 through Tn which are equal in number to the current-limiting elements S1 through Sn are arranged. The primary windings of those transformers A1 through An are connected to the respective current-limiting elements S1 through Sn in the same polarity. And the secondary windings B1 through Bn of the transformers are connected in parallel with one another.

Figure 2:
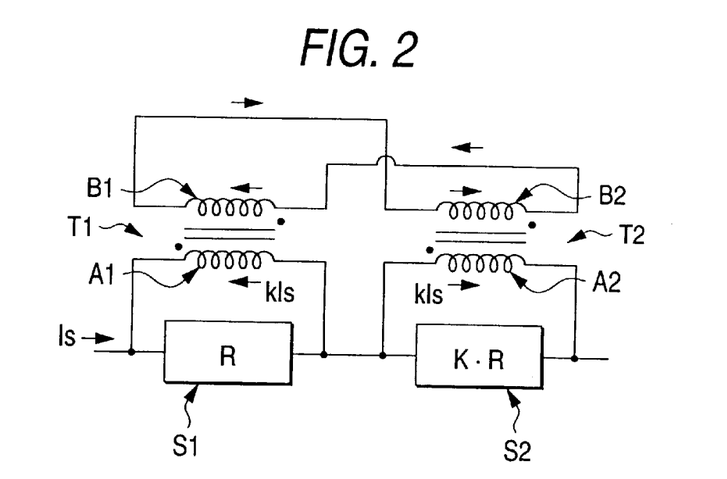
FIG. 2 is a circuit diagram showing the first embodiment of the current-limiting device in which two current-limiting elements are employed.

The operation of the above-described current-limiting device will be concretely described with reference to FIG. 2 in detail. In FIG. 2, two current-limiting elements S1 and S2 are series-connected which are equal in rating, and those elements S1 and S2 have single-phase transformers T1 and T2, respectively. Each of the single-phase transformers T1 and T2 are ideal transformers which are free from leakage and are negligible in winding resistance.

In the case of the super-conductive current-limiting element, during the steady period of a super-conductive state, the resistances of the super-conductive current-limiting elements S1 and S2 are substantially zero (0), and therefore current flows to the elements. On the other hand, if it is assumed that over-current flows because of the occurrence of a short-circuit accident a, and due to the non-uniformity in characteristic of the elements one S2 of the two super-conductive current-limiting elements S1 and S2 are increased in resistance by the quench phenomenon. Then, the over-current flows to the transformer connected to the element S2.

As was described above, the secondary winding B1 of the transformer T1 is parallel-connected to the secondary winding B2. Therefore, the over-current flowing in the transformer T2 flows as indicated by the arrows in FIG. 2. On the other hand, the transformer T1 is connected in the same polarity. Therefore, a primary current Is is induced (corresponding to k=1 in FIG. 2) so as to increase the current of the super-conductive current-limiting element S1 which is not quenched yet (which is substantially zero in resistance). As a result, the current flowing in the super-conductive current-limiting element S1 is quickly increased to 2Is, so that immediately quenched, and increased in resistance. Thus, all the super-conductive current-limiting elements S1 and S2 are quenched.

The quench resistance shows a significant positive resistance-temperature characteristic. During the quench initial period, the two super-conductive current-limiting elements S1 and S2 are different in resistance. Therefore, the process that those elements S1 and S2 are made uniform in resistance will be described in detail. The following description of the process is applicable to the thermal current-limiting element.

It is considered that, for instance, the resistance of the super-conductive current-limiting element during the quench initial period, or the resistance of the thermal current-limiting element during the steady period is represented by R, and a short-circuiting current flowing, the resistance of the current-limiting element S2 is increased because of the fluctuation in characteristic, thus becoming K times that of the current-limiting element S1. If, in this case, the transformer T2 is not provided, then the terminal voltage of the current limiting element S2 is increased to K•R•Is. However, since the secondary windings B1 and B2 of the two transformers T1 and T2 are parallel-connected to each other, the secondary voltages of the two transformers T1 and T2 are equal to each other. Accordingly, the current is divided so that the terminal voltages of the two current-limiting elements S1 and S2 are equal to each other.

If it is assumed that, of the short-circuiting current Is, k•Is flows to the transformer T2, then a current k•Is (opposite in direction) flows to the transformer T1 through the secondary windings B1 and B2.

The current-limiting element S1
current: Is (1+k), and
terminal voltage: R•Is•(1+k)
The current-limiting element S2
current; Is (1−k), and
terminal voltage; K•R•Is (1−k)

Since the terminal voltages of the two current-limiting elements S1 and S2 are equal to each other, $$k=(K-1)/(K+1)$$

If it is assumed that the resistance of the current-limiting element S2 is increased three times (K=3), as is apparent from the above equation, k=0.5. Accordingly, the current flowing in the current-limiting element S2 is 0.5 Is, while the current flowing in the current-limiting element S1 is 1.5 Is. And the amount of heat ($I^2R$ loss) generated by the current-limiting element S2 is $(0.5 Is)^2 \cdot 3R$, while the amount of heat generated by the current-limiting element S1 is $(1.5 Is)^2 \cdot R$. Accordingly, when compared with the amount of heat generated by the current-limiting element S2 (whose resistance is increased three times), the amount of heat generated by the current-limiting element S1 (whose resistance is not increased yet) is increased three times.

The current-limiting element S1 (which is low in resistance) is larger both in element current and in the amount of generated heat than the current-limiting element. Therefore, the quench is quickly advanced (in the case of the super-conductive current-limiting element), or the generation of heat (in the case of the thermal current-limiting element) is effected. Accordingly, the elements become equal in resistance, whereby the current balance is obtained. That is, the fluctuation in resistance of the plurality of current-limiting elements S1 through Sn (which is due to the quench or the generation of heat) is compensated by the combination of the transformers T1 through Tn. Therefore, the voltages assigned to the current-limiting elements S1 through Sn are made constant to prevent the concentration of over-voltage, and to prevent the loss of melting which is due to the over-concentration of heat generated.

During the steady period in which the super-conductive current-limiting element is in super conductive state, or during the period in which the current-limiting operation is stable,; that is, in the case (the current balance state) where all the current-limiting elements S1 through Sn are equal in resistance, the currents flowing in the transformers T1 through Tn are zero. Therefore the transformers T1 through Tn have only exciting currents, and the temporary resistance unbalance, which may occur during the current-limiting operation (in which the secondary currents flow), is for a very short time, of the order of several cycles. Hence, the capacities of the transformers T1 through Tn may be those which satisfies the short time capacity which is required for the current-limiting operation; that is, it may be small, of the order of (exciting capacity+α).

The above description is equally applied to the case where more than two current-limiting elements are employed. In the case where the secondary windings B1 through Bn of the transformers T1 through Tn are connected in parallel to one another, even if the resistances are different due to the fluctuation in element characteristic, the terminal voltages (the primary voltages of the transformers) of the current-limiting elements S1 through Sn are equal to one another. In this case, the currents flow through the transformers T1 through Tn in such a manner that the amounts of heat ($I^2 R$ loss) generated by the current-limiting elements S1 through Sn are inversely proportional to the resistances. Therefore, the fluctuation in resistance of the current-limiting elements S1 through Sn are quickly eliminated.

Figure 3:
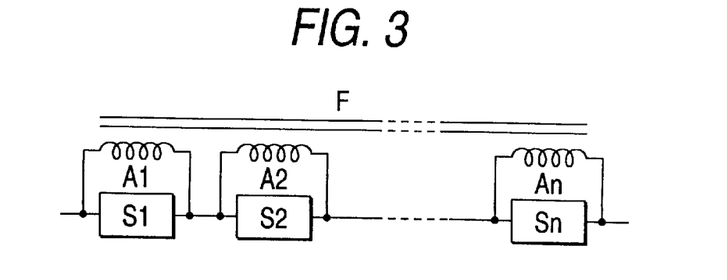
FIG. 3 is a circuit diagram showing a second embodiment of the current-limiting device.

Now, a second embodiment of the invention will be described with reference to FIG. 3. According to the second embodiment, in an electric power system in which a plurality of current-limiting elements S1 through Sn are connected in series to one another. Windings A1 through An which are equal in number to the current-limiting elements S1 through Sn are tightly magnetically coupled to one another with a common iron core F. The windings A1 through An are connected to the current-limiting elements S1 through Sn, respectively, in such a manner that they are equal in polarity.

Figure 4:
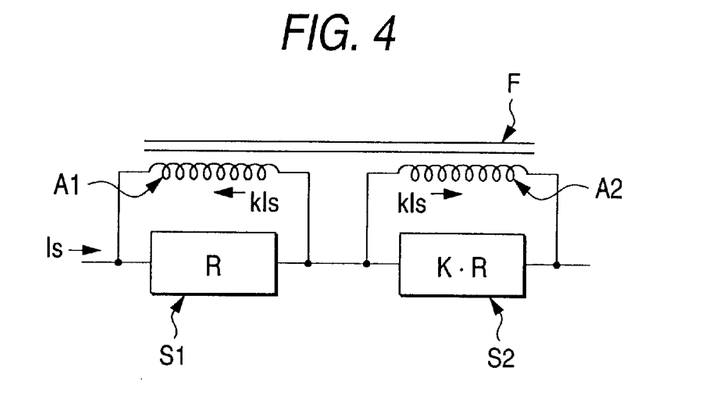
FIG. 4 is a circuit diagram showing a second embodiment of the current-limiting device, in which two current-limiting elements are connected in series to each other.

If it is assumed that, in the current-limiting device, the elements S1 through Sn are equal in rating, the windings A1 through An are equal in the number of turns, and the leakage flux can be disregarded, the operation of the second embodiment can be compared with that of the first embodiment as follows:

The windings A1 through An wound on one and the same iron core F are equivalent to n winding transformers, and are equal in the number of turns. Therefore, the windings A1 through An are equal in inter-terminal voltage to one another, and winding current flows in such a manner that the sum of ampere turns is substantially zero. Accordingly, in the case of two current-limiting elements S1 and S2 (n=2) as shown in FIG. 4 (the second embodiment), when compared with the case where, as in the case of the above-described first embodiment, the secondary windings B1 and B2 of the transformers T1 and T2 are connected in parallel to one another (cf. FIG. 2), the same effect is obtained without the secondary windings B1 and B2.

Figure 5:
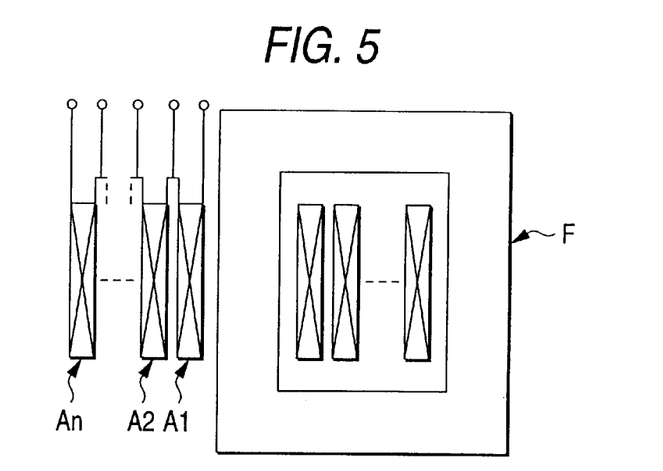
FIG. 5 is a diagram showing the winding structure of the second embodiment of the present invention.

In the case of the super-conductive current-limiting element, with respect to the operation in which the super-conductive state is shifted to the quenching state, the operation of the second embodiment is the same as that of the first embodiment except that, if at least one of the elements is super-conductive, then the terminal voltage of the winding becomes substantially zero; the remaining description is the same as that of the first embodiment. It is effective that, as shown in FIG. 5, the windings A1 through An are mutual-induced as tightly as possible. Therefore it is preferable that they are coaxially wound on one and the same iron core F.

Figure 6:
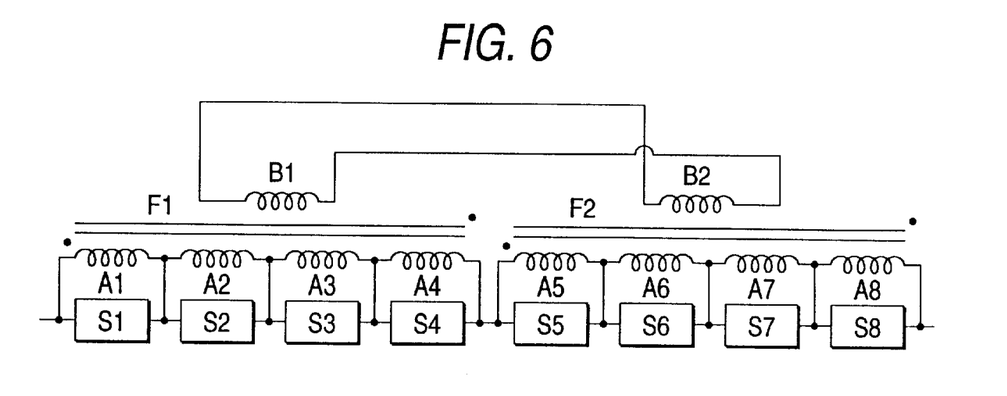
FIG. 6 is a circuit diagram showing a third embodiment of the invention which are a combination of the first and second embodiments.

FIG. 6 shows a third embodiment of the present invention which is a combination of the first and second embodiments of the present invention. The third embodiment is effectively applicable to the following case. That is, the windings A1 through An of a plurality of current-limiting elements S1 through Sn are arranged on one and the same iron core F. The number of connections of the current-limiting elements S1 through Sn are large. Then, the number of windings A1 through An is large, so that it is difficult to fix, for instance, the wiring leads. It is difficult to manufacture the current-limiting device.

That is, in the current-limiting device, as shown in FIG. 6, a plurality of current-limiting elements S1 through S4, and S5 through S8 (four current-limiting elements, and four current-limiting elements), primary windings A1 through A4, and A5 through A8 provided respectively for the current-limiting elements S1 through S4, and S5 through S8, and a plurality of iron cores F1 and F2 (two iron cores in FIG. 6) on which the primary windings A1 through A4 and A5 through A8 are provided in the form of a plurality of blocks (two blocks in FIG. 6), and secondary windings B1 and B2 are provided for the blocks, respectively, and are parallel-connected in the same polarity. In the device thus formed, the windings arranged on one iron core F1 (or F2) are only the windings A1 through A4 (or A5 through A8) and the secondary winding B1 (or B2). Therefore, with the current-limiting device, it is easy to fix wiring leads, and accordingly, it is easy to manufacture the current-limiting device.

The preferred embodiments of the present invention have been described with reference to the case where the current-limiting device is applied to the electric power system. However, the present invention is not limited thereto or thereby. That is, the technical concept of the present invention is applicable to general AC circuits other than electric power systems.

As is apparent from the above embodiments, in the current-limiting device, the transformers the number of which is equal to that of a plurality of series-connected current-limiting elements, and the primary windings of the transformers are connected to the current-limiting elements in the same polarity, respectively. Therefore, even if one or some of the current-limiting elements are increased in resistance because of the fluctuation in characteristic, the short-circuiting current is caused to flow to the transformer side to increase the resistances of the remaining current-limiting elements which have not been increased in resistance. Hence, the element voltages are kept uniform at all times. That is, the concentration of over-current is prevented, and the difficulty is prevented that the elements are thermally broken.

On the other hand, the windings the number of which is equal to that of a plurality of series-connected current-limiting elements are coupled to one another through the common iron core, and the windings are connected to the current-limiting elements in the same polarity, respectively. In this case, unlike the above-described case, no secondary windings are required. Hence, the resultant current-limiting device is small in size, and low in manufacturing cost.

Next, a plurality of primary windings, and a single secondary winding are magnetically coupled to one another through a common iron core to form a unitary block. A plurality of primary windings of each block thus formed are connected to the current-limiting elements in the same polarity, respectively, and all the secondary windings of the blocks are connected in parallel to one another. In each block of this current-limiting device, the primary windings and the secondary windings are wound on one and the same iron core. Hence, even if the number of connecting points of the current-limiting elements is increased, in the current-limiting device, for instance the lead wires can be led out with ease; that is, the resultant current-limiting device is simple in structure.

A fourth embodiment of the current limiting device according to the present invention will be described as follow.

Figure 12:
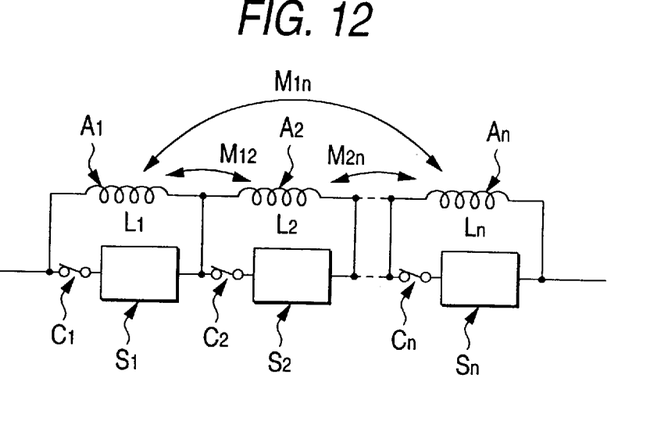
FIG. 12 is a circuit diagram showing a current limiting device, which constitutes a fourth embodiment of the invention.

In the current limiting device shown in FIG. 12, a plurality of current limiting elements S1 through Sn are connected in series to one another between the power source 1 of an electric power system and the load thereof. Windings A1 through An, which are equal in number to the current limiting elements S1 through Sn, are formed in such a manner that they are magnetically coupled to one another. They are connected to the current limiting elements S1 through Sn, respectively, in such a manner that they are the same in polarity.

Alternatively, the current limiting device of the present invention can have a rectifying bridge circuit 14 (cf. FIG. 10 or 11). In the circuit 14, four diodes $D_1$ through $D_4$ are bridge-connected to one another, and the AC terminals 15 and 16 are connected in series to an electric power system, and a DC reactor 19 is connected between the DC terminals 17 and 18. A plurality of thermal current limiting elements S1 through Sn are connected in series to the rectifying bridge circuit 14 on the AC side thereof. Windings A1 through An which are equal in number to the thermal current limiting elements S1 through Sn are formed in such a manner that they are magnetically coupled to one another, and are connected to the thermal current limiting elements S1 through Sn in the same polarity, respectively. It is preferable that the thermal current limiting elements S1 through Sn are positive temperature characteristic (PTC) thermistors formed with polymer series materials or barium titanate series materials.

In this case, the rectifying bridge circuit 14 is combined with the thermal current limiting elements S1 through Sn, so that the characteristic of the rectifying bridge circuit complements those of the thermal current limiting elements and vice versa. That is, at the time of occurrence of a short-circuiting accident a the rectifying bridge circuit 14 positively suppresses the sudden current, thus providing a current limiting effect in high-speed response. With the aid of the thermal current limiting elements S1 through Sn, the current limiting function is maintained for a relatively long period of time, thus providing a current limiting effect in low-speed response.

Figure 13:
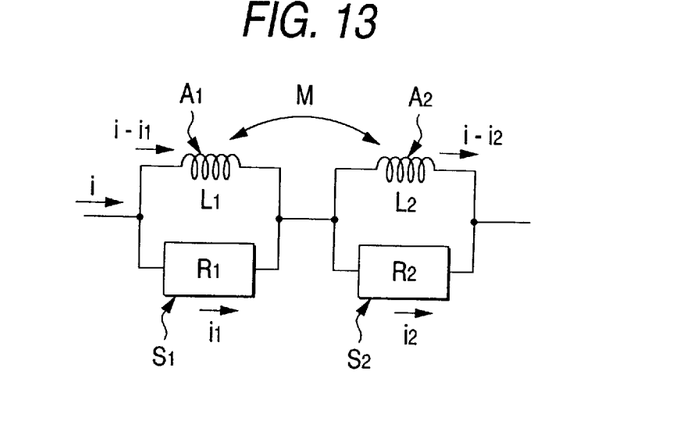
FIG. 13 is a circuit diagram for explaining the operation of the current limiting device according to the invention, in which two current limiting elements are connected in series to each other.

The operation of the current limiting device will be concretely described with reference to FIG. 13. In the device shown in FIG. 13, two current limiting elements S1 and S2, which are equal in rating, are connected in series to each other. In FIG. 13, switches (described later) are not shown which are provided for the current limiting elements S1 and S2, respectively. If it is assumed that the current limiting elements S1 and S2 have resistances $R_1$ and $R_2$ (which are very low resistances corresponding to AC loss during the normal operation), respectively, then the following equations are established:

$$L_1(d(i-i_1))/dt+M(d(i-i_2))/dt=R_1 i_1 \qquad (1)$$

$$L_2(d(i-i_2))/dt+M(d(i-i_1))/dt=R_2 i_2 \qquad (2)$$

From the equation, $$d(i-i_2)/dt=-M(d(i-i_1)/L_2 dt+(R_2/L_2)/i_2 \qquad (3)$$

If this is substituted in the above equation, then the following equation is obtained:

$$(L_1-(M^2/L_2))(d(t-t_1))/dt=R_1 i_1-(M/L_2)R_2 i_2 \qquad (4)$$

For simplification in description, it is assumed that the magnetic coupling of the windings A1 and A2 is ideal (no leakage), and $L_1 L_2 = M^2$, and $L_1 = L_2$, then from the above equations $R_1 i_1 = R_2 i_2$ is obtained.

Hence, in the case where the element resistance is normally R and a short-circuit current i flows, so that the resistance of the current limiting element S2 increases by a factor K; that is, $K=R_2/R_1$, the currents flowing in the current limiting elements S1 and S2 are $i_2/i_1=R_1/R_2=1/K$. In the case of the thermal current limiting elements, the amount of heat generated by each of the thermal current limiting elements is $i_2^2 R_2/i_1^2 R_1=1/K$. The mutual induction between the windings A1 and A2 acts to decrease the current in the thermal current limiting element S2 whose resistance is increased, and to increase the current in the thermal current limiting element S1 whose resistance is not increased. The amount of heat generated by the current limiting element S whose resistance is not increased abruptly increases by a factor K; that is, the element S1 is quickly increased in resistance.

Accordingly, as shown in FIG. 12, in the steady state, the current limiting elements S1 through Sn are substantially zero in resistance, and current flows in the elements. However, if the over-current flows, for instance due to the occurrence of a short-circuiting accident a (cf. FIG. 7 or 8), since the elements are usually not uniform in characteristic, at least one of the current limiting elements is increased in resistance, so that the over-current flows in the winding connected to that current limiting element.

In this case, the windings A1 through An of the current limiting elements S1 through Sn are magnetically coupled to one another, and are connected to the elements S1 through Sn in the same polarity, respectively. Therefore, because of the mutual induction of the windings A1 through An, in the current limiting element whose resistance is increased the current decreases, while in the current limiting element whose resistance is not increased the current increases. Because the current increases in this way, the current limiting element whose resistance is not increased is increased in resistance. Thus, even if the current limiting elements S1 through Sn are not uniform in characteristic, those elements S1 through Sn are uniformly increased in resistance.

In the above-described embodiment, as shown in FIG. 12, the current limiting elements S1 through Sn and the windings A1 through An (which have self-inductances $L_{11}$ through $L_{nn}$) are magnetically coupled to one another. If the mutual inductances of the windings A1 through An are represented by $L_{12}$, $L_{1n}$, $L_{2n}$, in the case where the windings A1 through An are connected in series, the combined inductance L is $\Sigma\Sigma L_{ij}$ (i=1 through n, and j=1 through n). This combined inductance L is determined from the specification of an electric power system to which the current limiting device is coupled. For instance, in the case where the current limiting elements S1 through Sn are coupled to the system whose linkage cannot be opened, it is made equal to the inductance of the current limiting reactor 4 (cf. FIG. 5) or the current limiting reactor 20 (cf. FIG. 11). In addition, in the case where the current limiting elements S1 through Sn are coupled to the system whose linkage can be opened, the combined inductance L is equal to or larger than the minimum value which is determined from the aimed current limiting value.

The current limiting device according to the present invention is applicable not only to the case where the current limiting elements are applied to the system whose linkage can be opened (having no current limiting reactor which is parallel-connected to the current limiting element S) (cf. FIG. 7) but also to the case where the current limiting elements are applied to the system whose linkage cannot be opened (having the current limiting reactor 4 which is parallel-connected to the current limiting element S) (cf. FIG. 8).

Further, the current limiting device according to the present invention is also applicable not only to the case where the thermal current limiting elements are applied to the system whose linkage can be opened (having no current limiting reactor which is parallel-connected to the thermal current limiting element S) (cf. FIG. 10) but also to the case where the thermal current limiting elements are applied to the system whose linkage cannot be opened (having the current limiting reactor 20 which is parallel-connected to the thermal current limiting element S) (cf. FIG. 11).

In the case where the current limiting elements S1 through Sn are applied to the system whose linkage cannot be opened, generally it is necessary to connect the current limiting reactor 4 (cf. FIG. 8) or the current limiting reactor 20 (cf. FIG. 11) in parallel to the current limiting elements S1 through Sn. In the present invention, when all the current limiting elements S1 through Sn are increased in resistance, and the short-circuiting current is transferred to the windings, those windings A1 through An serve as series-connected windings, thus functioning as a current limiting reactor. Hence, in the present invention, it is unnecessary to connect the current limiting reactor 4 (cf. FIG. 5) or the current limiting reactor 20 (cf. FIG. 11) in parallel to the current limiting elements S1 through Sn. This feature reduces the number of components and makes the device compact as much.

Figure 14:
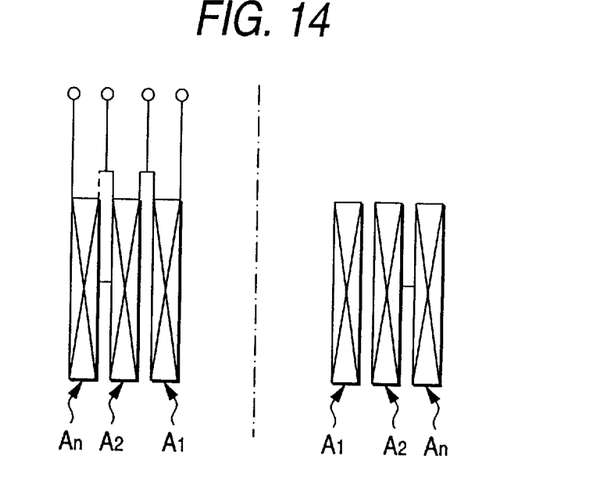
FIG. 14 is a diagram showing an structure of windings in the current limiting device according to the invention.

In the present invention, the windings A1 through An are arranged coaxial. However, if those windings are magnetically coupled to one another, then the arrangement of the windings is not limited thereto or thereby. Although the windings shown in FIG. 14 are of no-core type, they may be reactors having iron cores with gaps.

It is preferable that, as shown in FIG. 12, switches C1 through Cn are provided for the current limiting elements S1 through Sn, respectively. Those switches function as follows: In the case where, at the time of occurrence of a short-circuiting accident, the over-current increases the resistance of any one of the current limiting elements S1 through Sn, the switch corresponding thereto is opened to interrupt only the current limiting element. After the short-circuiting accident is eliminated, the switch C1 to Cn is closed, so that the current limiting element S1 to Sn is used again.

In the case of the super-conductive current limiting element, a part (weak point) of the element is quenched earlier, and the quenching is developed so that the whole element is quenched. Therefore, in the initial period of the quenching operation, generally the super-conductive current limiting elements are different in resistance from one another. Even if the elements are different in resistance from one another as was described above, in the present invention, the above-described mutual induction of the windings functions so that, with respect to the current limiting element which is increased in resistance, the current is decreased, and, with respect to the current limiting element which is not increased in resistance, the current is increased. Hence, in the present invention, the current limiting elements are uniformly increased in resistance. The above-described fluctuation in resistance may be said about the thermal current limiting elements.

In the above-described embodiment, the technical concept of the present invention is applied to the case where the current limiting device is coupled to the electric power system; however, the invention is not limited thereto or thereby. That is, it goes without saying that the technical concept of the invention is applicable to general AC circuits other than electric power systems.

As was described above, in the current limiting device of the present invention, the winding coils which are equal in number to the super-conductive current limiting elements or thermal current limiting elements are formed in such a manner that they are magnetically coupled to one another, the windings coils thus formed are connected to the super-conductive current limiting elements or thermal current limiting elements in the same polarity, respectively. Further, the combined inductance of the windings which are connected in series to one another is equal to or larger than the minimum value which is determined from the aimed current limiting value. Therefore, even if some of the current limiting elements are increased in resistance, with the short-circuiting current transferred over to the windings the mutual induction of the windings quickly increases the resistances of the remaining current limiting elements which are not increased in resistance. Hence, even if the elements are not uniform in characteristic, those elements can be uniformly increased in resistance at all times. That is, the concentration of the over-voltage can be prevented, and the thermal current limiting elements can be prevented from being thermally broken. Consequently, the current limiting device of the invention is high both in quality and in reliability.

What is claimed is:

1. A current-limiting device comprising:
   a plurality of current-limiting elements connected in series; and
   a plurality of transformers,
   wherein the number of transformers equals the number of current-limiting elements;
   wherein each one of the plurality of transformers has a primary winding and a secondary winding;
   wherein the primary windings of the plurality of transformers are connected in parallel to the current-limiting elements, respectively; and
   wherein the secondary windings are connected in parallel to one another.

2. The current-limiting device according to claim 1, wherein the plurality of current-limiting elements are either super-conductive current-limiting elements, which increase in resistance by a super conductor quench phenomenon, or thermal current-limiting elements, which generate heat by over-current and increase in resistance by temperature rise.

3. A current-limiting device comprising:
   a plurality of current-limiting elements connected in series;
   a plurality of windings; and
   a common iron core to which the windings are magnetically coupled,
   wherein the number of windings equals the number of current-limiting elements; and
   wherein the windings are connected in parallel to the current-limiting elements, respectively.

4. The current-limiting device according to claim 3, wherein the plurality of current-limiting elements are either super-conductive current-limiting elements, which increase in resistance by a super conductor quench phenomenon, or thermal current-limiting elements, which generate heat by over-current and increase in resistance by temperature rise.

5. A current-limiting device comprising:
   a plurality of current-limiting elements connected in series; and
   a plurality of blocks,
   wherein each blocK comprises a plurality of primary windings, a secondary winding, and an iron core to which said plurality of primary windings and said secondary winding are magnetically coupled;
   wherein the sum of the plurality of primary windings for all the plurality of blocks equals the number of current-limiting elements;
   wherein the primary windings of the plurality of the blocks are connected, in parallel, to the plurality of current-limiting elements, respectively; and
   wherein all the secondary windings of the plurality of blocks are connected in parallel to one another.

6. The current-limiting device according to claim 5, wherein said plurality of current-limiting elements are either super-conductive current-limiting elements, which increase in resistance by a super conductor quench phenomenon, or thermal current-limiting elements, which generate heat by over-current and increase in resistance by temperature rise.

7. A current-limiting device comprising:
   a plurality of current-limiting elements connected in series; and
   a plurality of windings,
   wherein the number of windings equals the number of current-limiting elements;
   wherein the windings are magnetically coupled and are connected in parallel to the current limiting elements, respectively; and
   wherein a combined inductance of the plurality of windings, which are connected in series to one another, is equal to or larger than a minimum value which is determined from a predetermined current limiting value.

8. The current limiting device according to claim 7, wherein said plurality of current-limiting elements are either super-conductive current-limiting elements, which increase in resistance by a super conductor quench phenomenon, or thermal current-limiting elements, which generate heat by over-current and increase in resistance by temperature rise.

9. A current limiting device comprising:
   a rectifying bridge circuit;
   a DC reactor connected between DC terminals of the rectifying bridge circuit;
   a plurality of thermal current-limiting elements, which generate heat by over-current and increase in resistance by temperature rise, wherein the plurality of thermal current limiting elements are connected in series to an AC side of the rectifying bridge circuit; and
   a plurality of windings,
   wherein the number of windings equals the number of current-limiting elements;
   wherein the windings are magnetically coupled and the windings are connected in parallel to the current limiting elements, respectively; and
   wherein a combined inductance of the windings, which are connected in series to one another, is equal to or larger than a minimum value which is determined from a predetermined current limiting value.

* * * * *